(12) United States Patent
Herring et al.

(10) Patent No.: US 7,690,509 B2
(45) Date of Patent: Apr. 6, 2010

(54) CONTOUR FLAT BLADE PACKAGING DESIGN

(75) Inventors: Richard Herring, Granger, IN (US); Deborah Herring, legal representative, Granger, IN (US); Richard Stibbe, Granger, IN (US); Mike McKee, New Hudson, MI (US); Brian Fisher, LaPorte, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 284 days.

(21) Appl. No.: 11/859,319

(22) Filed: Sep. 21, 2007

(65) Prior Publication Data

US 2008/0073246 A1 Mar. 27, 2008

Related U.S. Application Data

(60) Provisional application No. 60/826,683, filed on Sep. 22, 2006.

(51) Int. Cl.
*B65D 75/04* (2006.01)
*B65D 73/00* (2006.01)

(52) U.S. Cl. .................. 206/470; 206/776; 206/461

(58) Field of Classification Search ........... 206/776, 206/471, 461, 464, 465, 470, 806, 349; D9/710; 15/250.001
See application file for complete search history.

(56) References Cited

U.S. PATENT DOCUMENTS

| | | | | |
|---|---|---|---|---|
| 1,803,239 A | * | 4/1931 | Deane | ............ 229/4.5 |
| 2,026,626 A | | 1/1936 | Gilfillan | |
| 2,326,648 A | | 8/1943 | Horr | |
| 2,965,280 A | * | 12/1960 | Miller | ............ 229/110 |
| 3,190,440 A | | 6/1965 | Palmer | |
| 3,324,998 A | | 6/1967 | Farquhar | |
| 3,487,915 A | | 1/1970 | Scott | |
| 3,637,130 A | | 1/1972 | Farquhar | |
| 3,814,235 A | | 6/1974 | Glaze, Jr. | |

(Continued)

FOREIGN PATENT DOCUMENTS

GB 649736 * 5/1951

*Primary Examiner*—Mickey Yu
*Assistant Examiner*—Steven A. Reynolds
(74) *Attorney, Agent, or Firm*—Robert Stearns; Dickinson Wright, PLLC

(57) ABSTRACT

A flat blade windshield wiper blade (12) has a naturally elongated curve with a delicate wiper element (16) to be protected during shipping and display for retail sales purposes. A protective package (12) surrounds the wiper (12). The package (12) is made from a single piece of sheet stock and includes a flexible, outwardly bowed front panel (24), a back panel (26), and opposing left (30) and right (28) side panels adjoining respective sides of the front (24) and back (26) panels. Top (32) and bottom (34) end flaps extend between the front (24) and back (26) panels for forcing the front (24) panel to form in a generally semi-cylindrical configuration bowed outwardly relative to the back panel (26). The wiper (12) is disposed in a shipping condition in the package (12), with a connector (22) feature of the wiper (12) bearing in direct pressing contact with the bowed front panel (24). The wiper element (16) is completely isolated from contacting the package (12) by wedging other portions of the wiper (12) in three discrete regions of direct contact against the bowed front panel (24) and three discrete regions of direct contact against the back panel (26).

14 Claims, 8 Drawing Sheets

U.S. PATENT DOCUMENTS

| | | |
|---|---|---|
| 3,929,222 A | 12/1975 | Smith et al. |
| 4,032,005 A | 6/1977 | Vereb |
| D248,375 S | 7/1978 | Bergstein |
| 4,239,104 A | 12/1980 | Roccaforte et al. |
| 4,378,903 A | 4/1983 | Sherwood |
| 4,846,394 A * | 7/1989 | Swanson .................... 229/4.5 |
| 5,325,561 A | 7/1994 | Kotlar |
| 5,518,168 A * | 5/1996 | Mayer ........................ 229/102 |
| 5,545,956 A * | 8/1996 | Salvio et al. ................ 318/283 |
| D389,401 S | 1/1998 | Holley, Jr. |
| 5,899,334 A * | 5/1999 | Domerchie et al. ......... 206/470 |
| 5,924,626 A | 7/1999 | Whitnell |
| D478,002 S | 8/2003 | Lin |
| 6,622,867 B2 * | 9/2003 | Menceles .................... 206/771 |
| 6,766,906 B2 * | 7/2004 | Charng ....................... 206/470 |
| 6,932,399 B2 | 8/2005 | Fonfrias |
| 2005/0252812 A1 | 11/2005 | Lewis |
| 2006/0213799 A1 | 9/2006 | Muller |
| 2007/0235362 A1 * | 10/2007 | Lewis ......................... 206/470 |

* cited by examiner

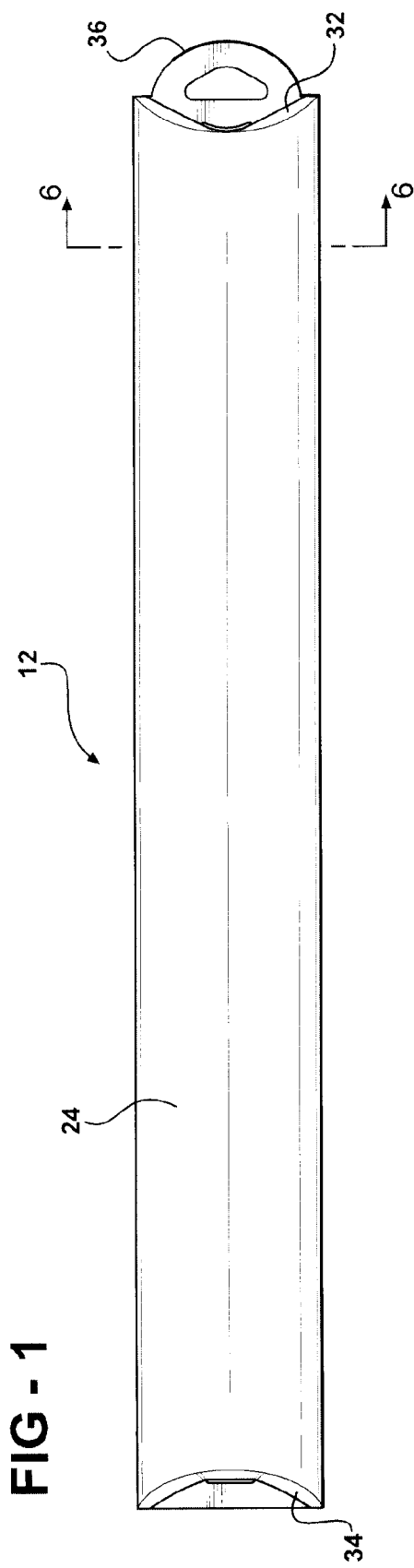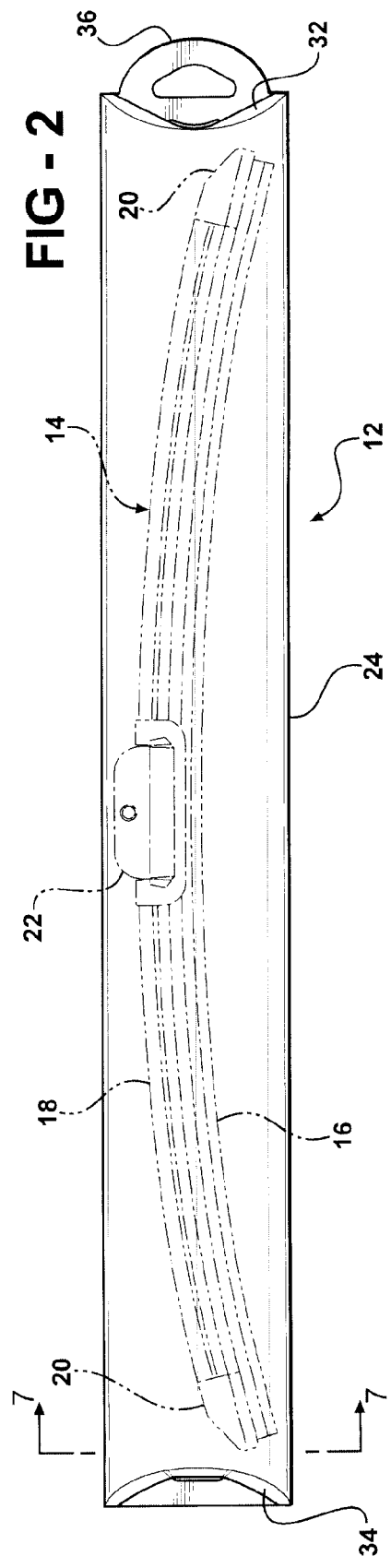

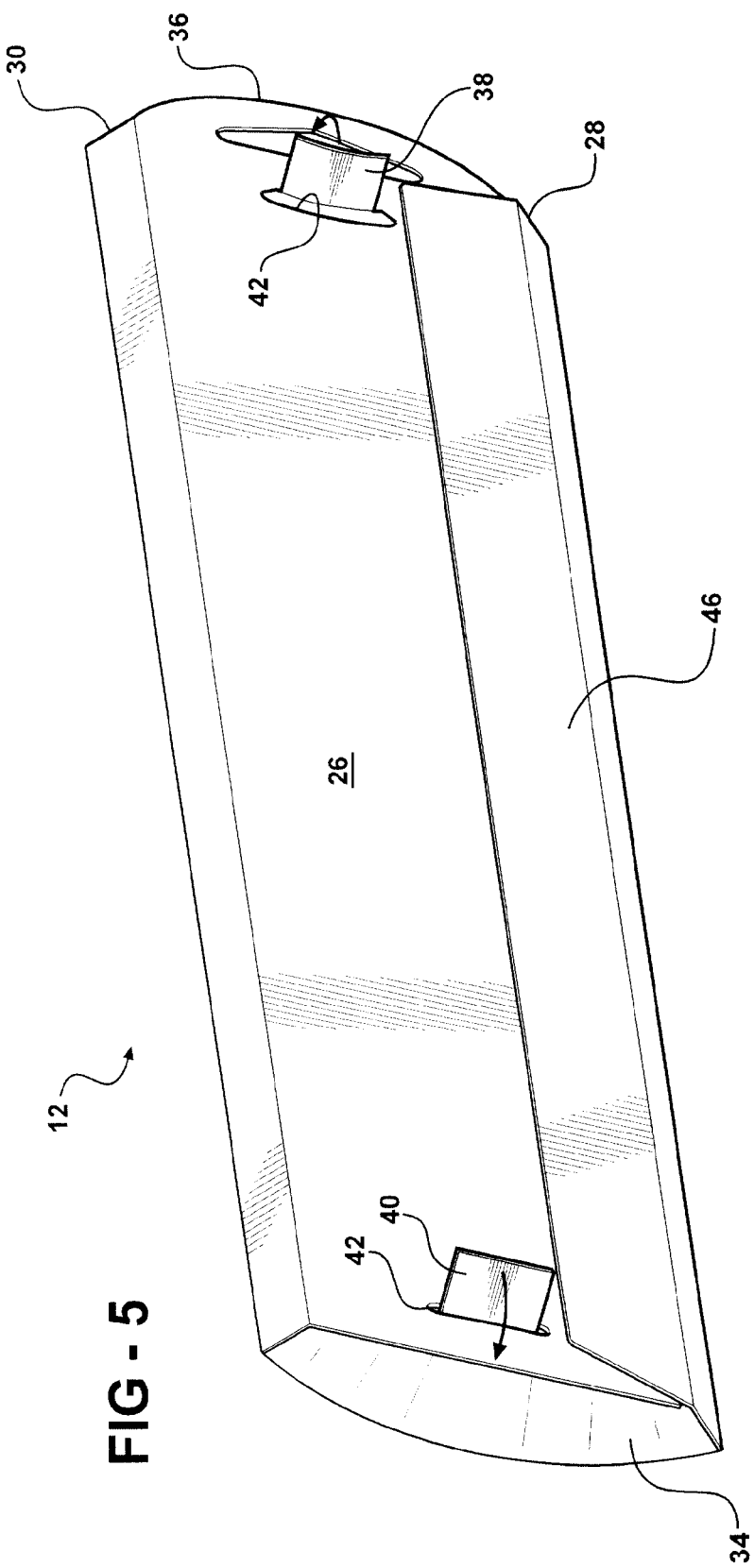

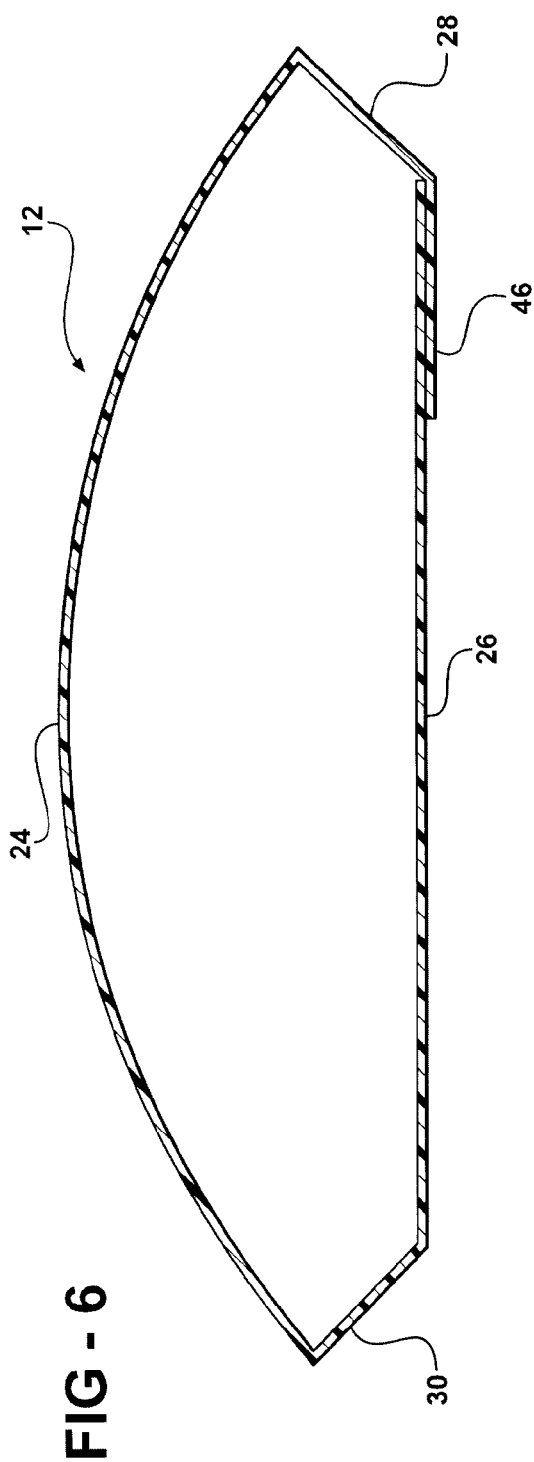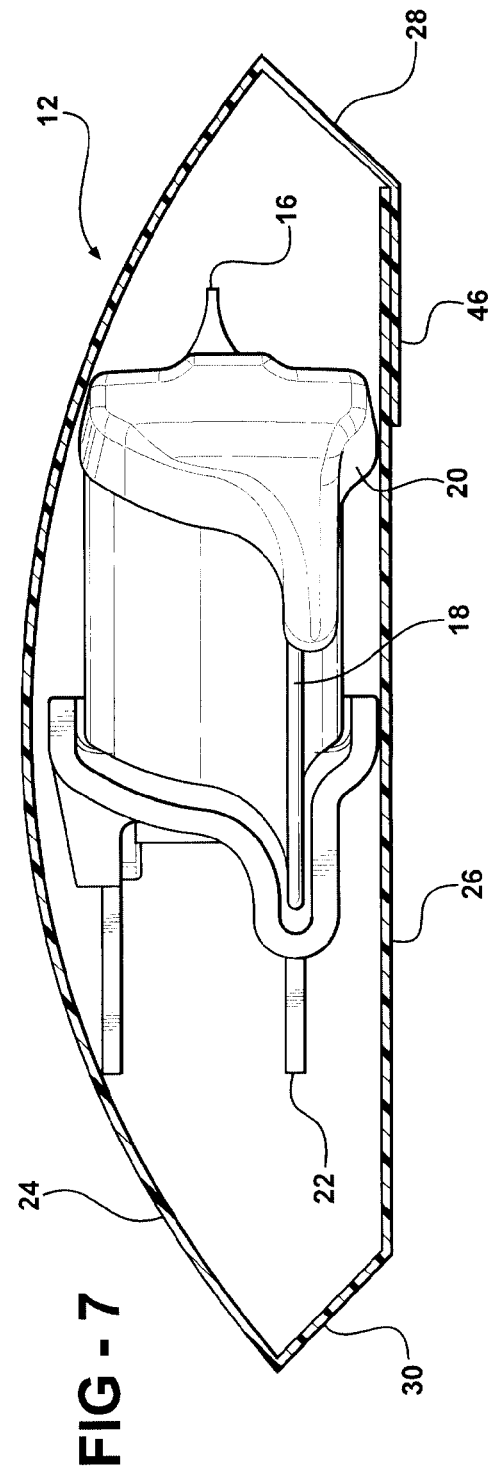

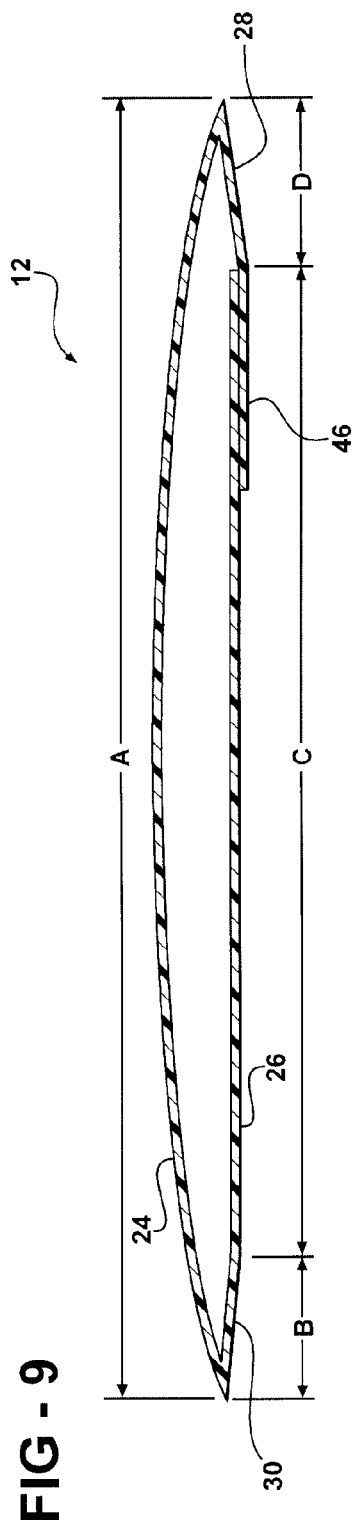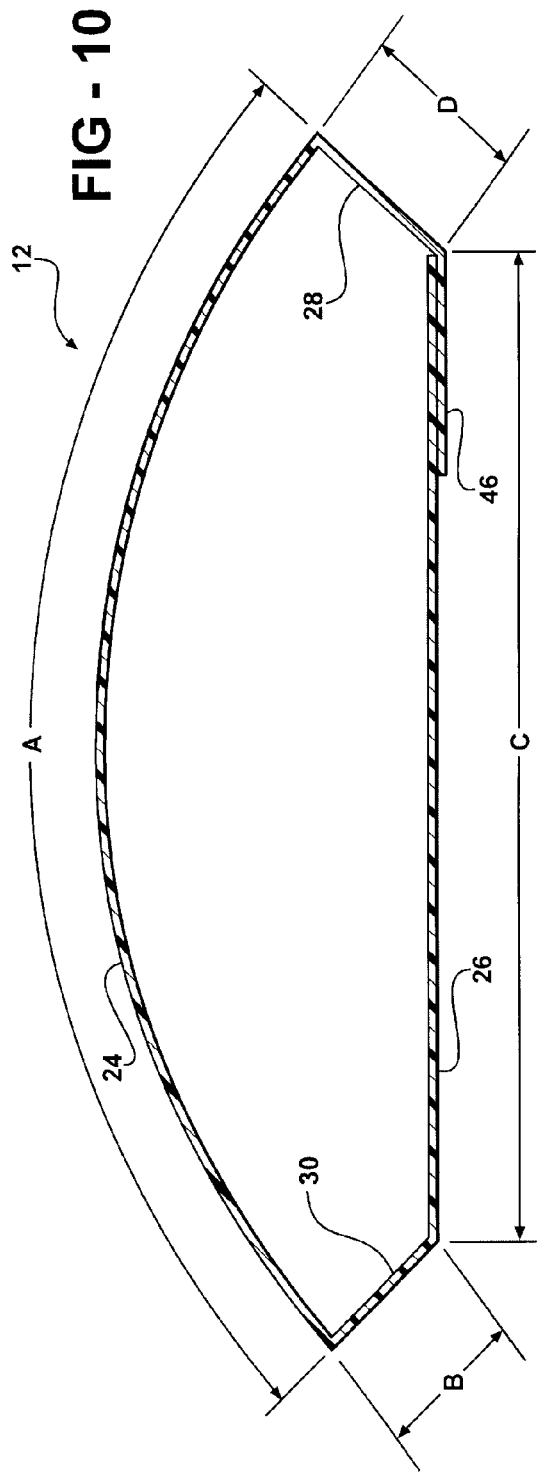

CONTOUR FLAT BLADE PACKAGING DESIGN

CROSS REFERENCE TO RELATED APPLICATIONS

The present application claims priority to U.S. provisional application entitled CONTOUR FLAT BLADE PACKAGING DESIGN having Ser. No. 60/826,683 and filed Sep. 22, 2006.

BACKGROUND OF THE INVENTION

1. Field of the Invention

The subject invention relates to a package design for a contour flat blade style wiper blade specially configured to protect the fragile wiper element during shipment without the need for auxiliary sleeves or expensive packaging elements.

2. Related Art

An emerging trend in windshield wiper blades are the so-called flat blade or yokeless style wiper. In its free state form, a flat blade wiper exhibits a pronounced curvature, which flattens when pressed against a windshield to conform to the shape of the windshield.

Packaging containers used to ship and display a flat blade style wiper have proven to be especially challenging for numerous subtle and diverse reasons. Replacement windshield wiper blades are typically packaged individually for sale in retail establishments. The wiping element of the wiper blade, i.e., the thin rubber strip which directly contacts the windshield glass, is somewhat fragile and must be protected through shipment and handling so that a good, clean wipe is achieved when the replacement wiper blade is finally installed on an automobile.

Protecting this delicate wiper element can be a challenge in flat blade style wiper products due to the pronounced natural curve of the blade. In particular, the tips or ends of the wiper element tend to be crushed inside the package during shipping. The prior art has taught the use of prophylactic devices to protect the delicate wiper element, which prophylactic devices are removed and discarded prior to installation of the wiper blade on the windshield. Prophylactic devices of this type may include plastic or paperboard sleeves, as well as specially molded or formed containers or cage-like frames that clip onto the flat style wiper blade. The flat blade, together with this prophylactic device, is then slipped into an outer sleeve or jacket forming the actual shipped product that is eventually displayed for retail purchase.

Thus, according to prior art techniques, the packaging for a flat blade wiper usually consists of two components: namely the inner guard-like prophylactic device which protects the wiper element, and the outer sleeve or covering which is attractively decorated with marketing indicia. Those of skill in the art will readily appreciate the added cost and complexity for shipping a flat blade style wiper device in two-part packaging.

Notwithstanding the cost complexity and weight issues, there is yet another concern somewhat peculiar to wiper blade sales. A large majority of retail customers feel compelled to remove the actual wiper blade from its package for visual inspection prior to purchase. If the wiper blade does not meet the buyer's satisfaction for any reason, the buyer makes a hasty attempt to return the blade to its packaged condition and re-hang it on the display shelf. However, if the process of returning the wiper blade to its original packaged condition is complicated or time consuming, the buyer is likely to do a poor job. As a result, the wiper blade is less attractive to the next buyer. Therefore, there is a need for a package that can be easily and properly re-filled with a wiper blade during the pre-purchase inspection process.

An additional consideration in terms of presenting replacement wiper blades for sale in a retail establishment comprises the amount of shelf space required to display the packaging. In the case of replacement wiper blades, these packages are typically hung on hooks and arrayed according to size and application. The smaller the packaging in both width and depth, the greater quantity of stock can be placed for a sale in a given aisle of the store. Conversely, it is important to emphasize the pronounced natural curve of the flat wiper blade.

Prior art packages having both inner and outer packaging components typically consume more selling space than would otherwise be desired. The reason is that the protective inner device used to guard the wiper element from damage increases the bulk of the entire packaging unit.

Furthermore, the prior art style packaging systems are bulky items. Often, the packaging designs cannot lie flat in the unfilled or empty condition. The empty package assembly, therefore, takes up an undesirably large space in a manufacturing plant waiting to be filled with replacement wiper blades.

For all of these reasons, an improved packaging system for flat blade wipers is needed in which the inner protective component for the wiper element can be eliminated, where the finished package assembly is as small as possible to provide added display space in a retail establishment, and in which the package can be shipped in its empty, flat, unfilled condition and wherein a prospective buyer can easily remove the wiper blade from its package for visual inspection but then easily return it to the package again.

SUMMARY OF THE INVENTION

The subject invention overcomes the shortcomings and disadvantages of the prior art by providing a flat blade style wiper blade and shipping container package assembly. The assembly comprises a flat blade windshield wiper having at least one elongated and curved flexor, a wiper element operatively connected to the flexor, and a connector affixed to said flexor generally midway along the length thereof. A protective package surrounds the wiper. The package includes a flexible front panel, a generally planar back panel, a generally planar left side panel adjoining respective sides of the front and back panels, and a generally planar right side panel adjoining respective sides of the front and back panels opposite the left side panel. The package further includes respective top and bottom end flaps spaced apart from one another, the top and bottom end flaps extend between the front and back panels for forcing the front panel to form in a generally semi-cylindrical configuration bowed outwardly relative to the back panel. The wiper is disposed in a shipping condition in the package between the top and bottom end flaps, with the connector of the wiper bearing in direct pressing contact with the bowed front panel while the wiper element is maintained in a spaced, non-touching relation to any portion of the package.

According to another aspect of the invention, a method is provided for containing a flat blade style windshield wiper blade in a shipping and display package. The method comprises the steps of: providing a flat blade windshield wiper having at least one elongated, curved flexor with longitudinally spaced apart terminal ends, a wiper element operatively connected to the flexor, and a connector affixed to the flexor generally midway along the length thereof; surrounding the wiper with a protective package, wherein the package includes a flexible front panel, a back panel, and opposing left and right side panels respectively adjoining sides of the front and back panels; forcing the front panel to form in a generally semi-cylindrical configuration bowed outwardly relative to the back panel; and wedging the wiper in three discrete regions of direct contact against the bowed front panel and three discrete regions of direct contact against the back panel while maintaining the wiper element in a spaced, non-touching relation to any portion of the package.

Both the assembly and methods forms of this invention overcome the prior art shortcomings by packaging a flat blade windshield wiper in such a manner that the delicate wiper element is isolated from any contact with the package features. Furthermore, the finished package assembly of this invention is efficiently small for purposes of retail display without detracting from the novel, curved nature of the wiper blade which is intriguing and attractive to buyers. And still further, a prospective buyer can easily remove the wiper blade from the package for visual inspection, and then easily return the wiper blade to the package in its intended shipping condition without damaging the wiper element.

BRIEF DESCRIPTION OF THE DRAWINGS

These and other features and advantages of the present invention will become more readily appreciated when considered in connection with the following detailed description and appended drawings, wherein:

FIG. 1 is a front elevation view of a package according to the subject invention;

FIG. 2 is a front view as in FIG. 1, but superimposing a typical flat blade style wiper as it might reside securely and safely housed within the package for point of purchase display;

FIGS. 5 and 5A are perspective views of the back side of the package;

FIG. 6 is a cross-sectional view of the idealized package shape as taken generally along lines 6-6 of FIG. 1;

FIG. 7 is a cross-sectional view showing the relative positions of a wiper blade tip and central connection device pressed against the insides of the package and taken generally along lines 7-7 in FIG. 2;

FIG. 9 is a cross-sectional view of the package in a flattened, unfilled shipping condition with dimensional relationships A-D corresponding to features depicted in FIG. 8;

FIG. 10 is a cross-sectional view of the package shown in its idealized configuration similar to that of FIG. 6 and including the dimensional relationships A-D corresponding to FIG. 8.

DETAILED DESCRIPTION OF THE PREFERRED EMBODIMENT

Figure 3:
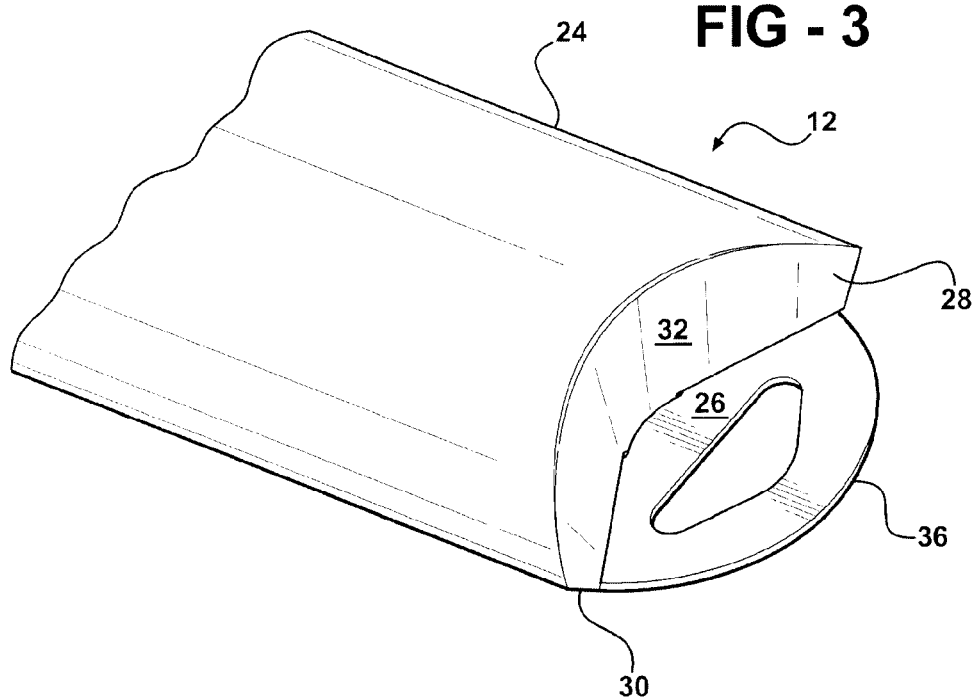
FIG. 3 is an enlarged fragmentary perspective view of the top end of the package.
Figure 4:
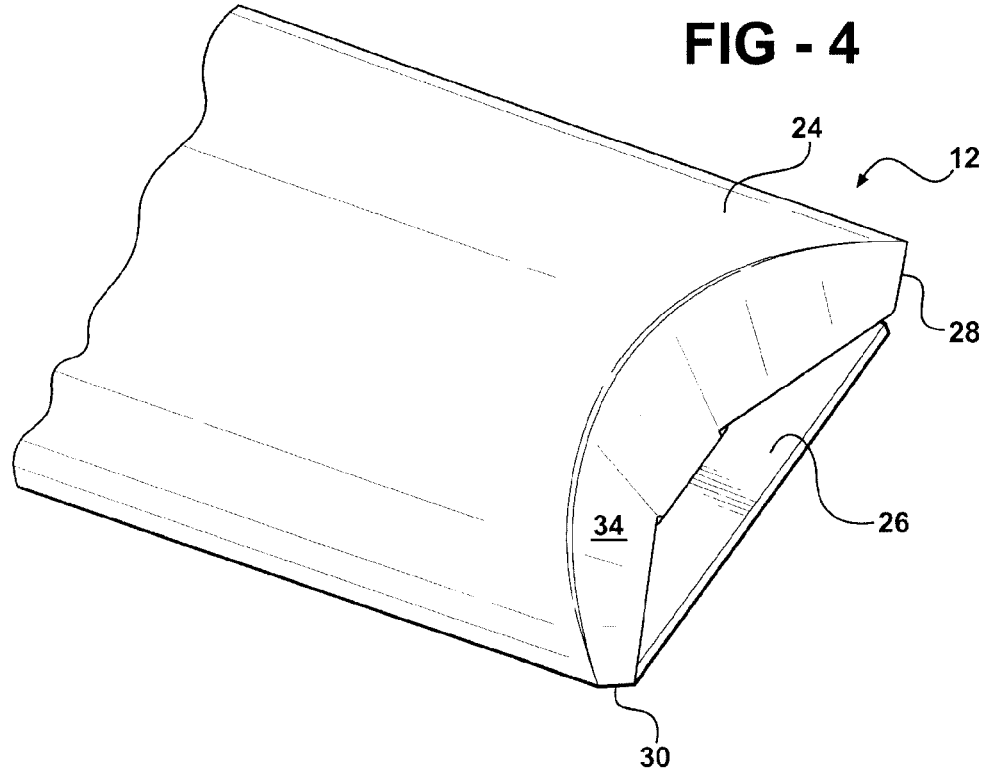
FIG. 4 is an enlarged fragmentary perspective view of the bottom end of the package.

Referring to the figures, wherein like numerals indicate like or corresponding parts throughout the several views, a package for containing a replacement wiper blade such as used in retail sales applications is generally shown at 12 in FIGS. 1 and 2. An exemplary flat blade style wiper device is generally indicated at 14 in FIG. 2. Wiper devices 14 of this type include an elongated rubber wiper element 16 adapted for direct contact against the windshield of a motor vehicle for scraping water and snow from the windshield as the wiper blade 14 is moved back and forth. To ensure a good quality wipe, it is critical that the wiper element 16 be protected from damage during shipping and handling. The wiper element 16 is captured by one or more metal flexors (not shown) made of spring steel or other highly resilient alloy formed with a curvature as depicted in FIG. 2. Spoilers 18 may be attached to the flexors to help maintain an even pressure of the wiper element 16 against the windshield during high driving speeds. End caps 20 snap-connect to the flexor ends to establish a finished, terminal end piece. A central connection device, or connector, 22 is permanently affixed to the flexors and serves to provide a connection point for the oscillating end of a wiper arm (not shown).

A wiper blade 14 transported in the subject package 12 is thus capable of achieving a perfect wipe of water or snow from a windshield when it is placed into service because the package 12 is structured so as to protect the wiper element 16. The package 12 is shown among the various figures including a front panel 24, a back panel 26, and left and right side panels 28, 30, respectively, interconnecting the front 24 and back 26 panels at spaced apart sides. The package 12 also includes a top end flap 32 and a bottom end flap 34, forming the respective top and bottom ends of the package 12. A hang tab 36 is created as an extension of the back panel 26 to provide a feature for hanging the package 12 in a store display.

Figure 5A:
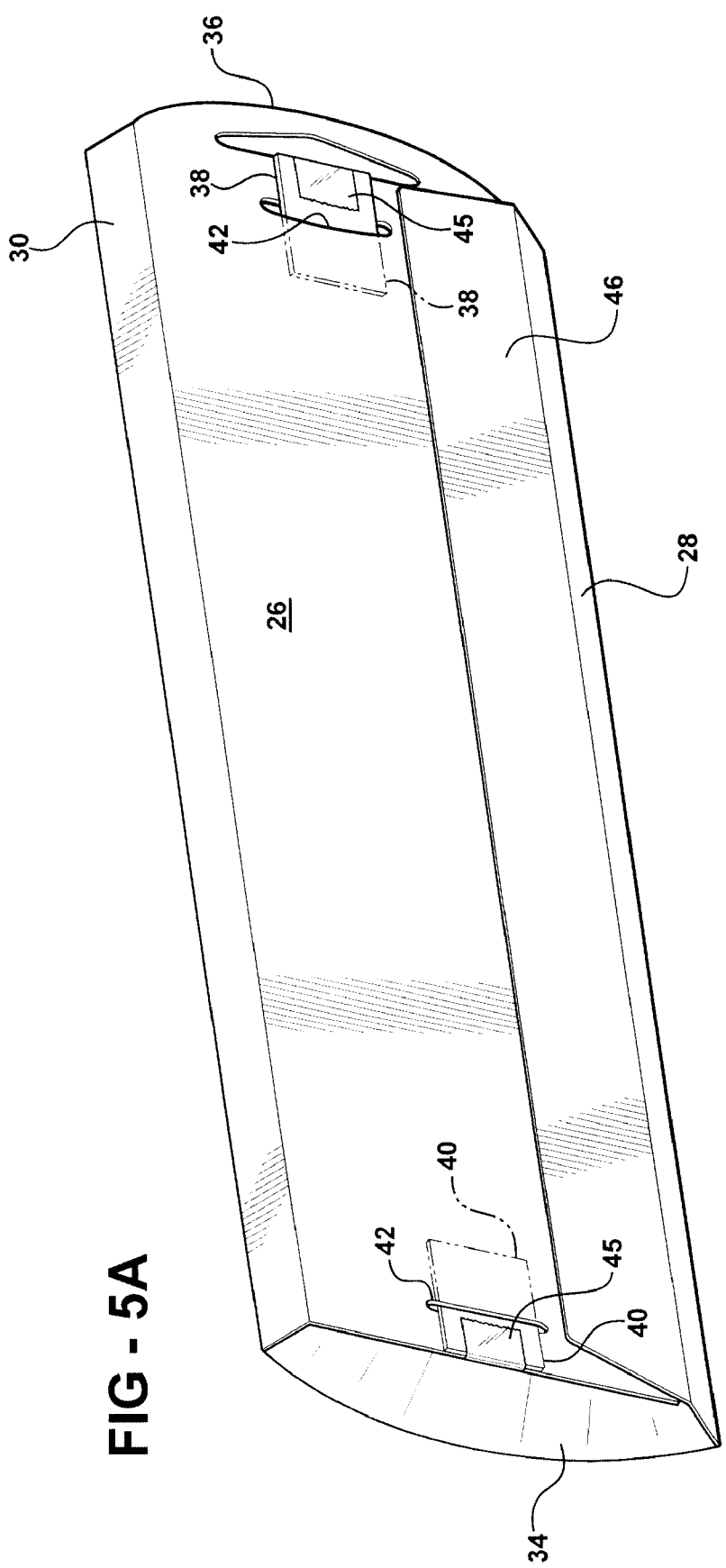
Figure 8:
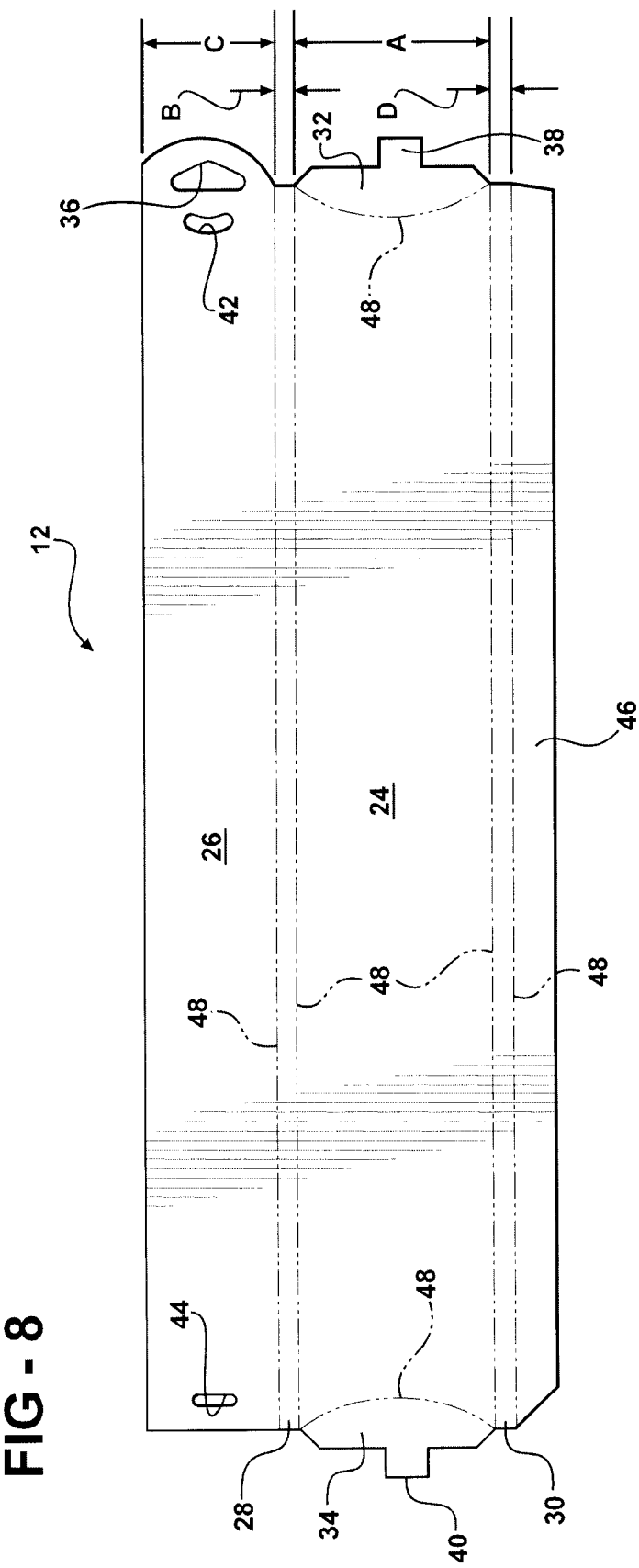
FIG. 8 is a top plan view of a sheet member die cut to shape for subsequent folding into the package shape as depicted in FIG. 1.

As perhaps best shown in FIGS. 5, 5A and 8, the top 32 and bottom 34 end flaps are provided with closure features in the form of extending tongues 38, 40, respectively, adapted to be received into specially formed slots 42, 44 in the back panel 26. When the package 12 is expanded from its flat shipping condition (as shown in FIG. 9), the end flaps 32, 34 are bent inwardly and their respective tongues 38, 40 directed into the slots 42, 44 as a method of retaining the package 12 in a closed condition. The tongues 38, 40 will take the orientation shown in FIG. 5 until bent flat against the back panel 26 as shown in FIG. 5A. The tongues 38, 40 can be folded flat against the extending portions of the back panel 26 and secured by safety tape 45, adhesive, ultrasonic welding, or the like. By this method, the package 12 is rendered tamper resistant. The tongues 38, 40 can be bent in either direction as suggested by the phantom lines in FIG. 5A. The slots 42 can either be straight or arcuate as shown in FIG. 8, or perhaps another suitable shape. The location of the slots 42 are determined relative to the length of the tongues 38, 40 so that when folded toward the outer ends, the tips of the tongues are generally flush with the cut ends of the back panel 26. This is also depicted in FIG. 5A.

Figure 11:
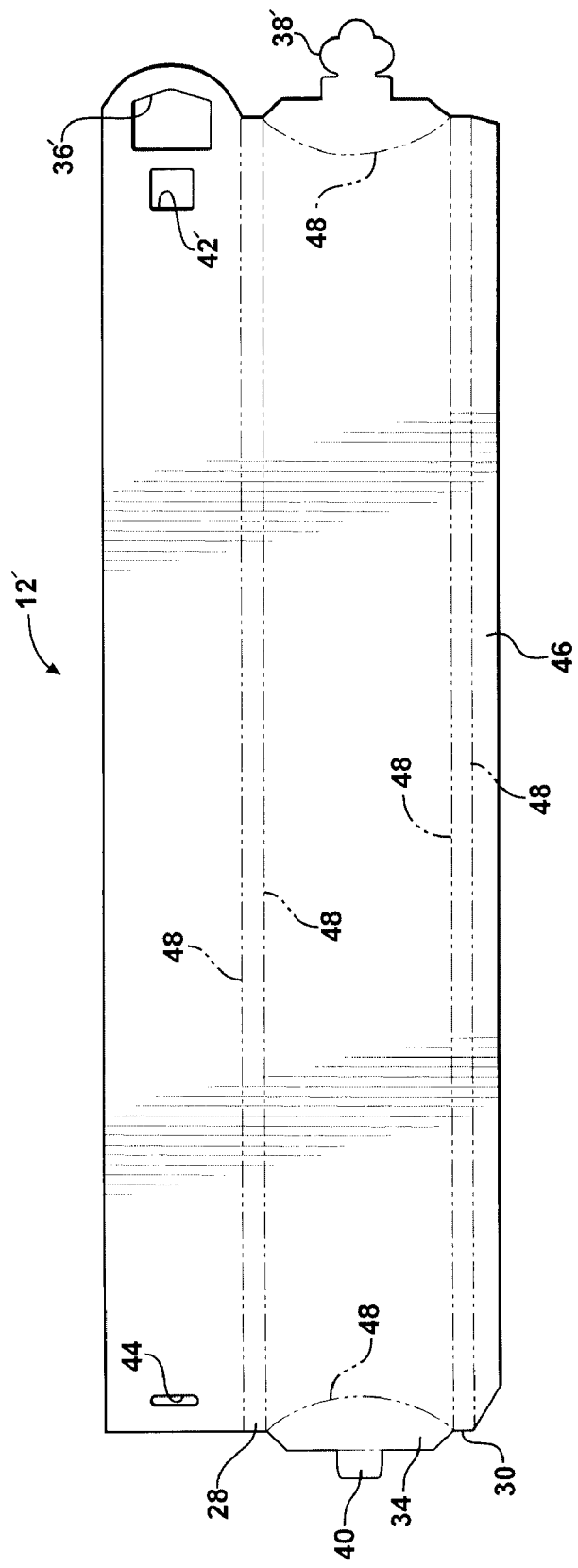
FIG. 11 is a top plan view as in FIG. 8, but showing an alternative closure configuration for one end of the package.

FIG. 11 depicts an alternative embodiment for the closure method adjacent the top end 32. In this example of the package 12', the tongue is transformed into a butterfly tab 38' that is engaged, in the folded condition (not shown) in the square slot 42'. Here also, the shape of the hang tab 36' is slightly modified.

The package 12 is shown in its flat, die cut condition in FIG. 8 (and also in FIG. 11). This represents the cutting of the sheet material used to form the package 12 from sheet stock. Either prior to or after the die cutting operation, advertising material can be imprinted upon the sheet stock. Preferably, although by no means necessary, the package 12 will be fabricated from a clear plastic sheet stock. Cardboard, opaque plastic, or any other suitable material may be used as an alternative. The die cut configuration shown in FIG. 8 also depicts a glue flap 46 extending along the left side panel 28. Between each panel and flap is formed a fold line 48, represented in FIG. 8 by broken lines. The fold lines 48 may comprise indentations, scores, creases, perforations, or other stress concentrating devices so that the sheet material can be readily and crisply formed into the configurations depicted in FIGS. 1-5.

The longitudinal length of the package 12 is preferably matched to the length of the wiper blade 14 to be installed in the package 12. Thus, a 24-inch long wiper blade 14 requires a longer package length than would be required for a 16-inch long wiper blade 14, and so forth. The cross-sectional shape of the package 12 along its length is generally continuous between the top 32 and bottom 34 ends. This cross-sectional shape is shown in a natural, unfilled form in FIG. 6. Of course, the precise natural cross-section is not strictly limited in proportion to that illustrated in FIG. 6.

FIG. 7 is a cross-section through the filled package 12 as taken from FIG. 2. Toward the right side panel 30, the end cap 20 of the wiper device 14 is shown wedged between the front 24 and back 26 panels. Toward the left side panel 28, the central connector 22 is captured between the front 24 and back 26 panels. Of particular note is the wiper element 16 which is held a safe distance away from the surfaces of the package 12 by way of the constricting (or collapsing) nature of the front 24 and back 26 panels. Preferably, the connector 22 bears in direct pressing contact with the bowed front panel 24 while the terminal end caps 20 on either end also bear in pressing contact, thereby creating three discrete regions of contact between the wiper blade 14 and the front panel 24 as shown here in FIG. 7. Likewise, the back panel is also contacted by the wiper blade 14 in three discrete regions of the connector 22, and each terminal end cap 20. Thus, by wedging the wiper 12 in three discrete regions of direct contact against the bowed front panel 24 and three discrete regions of direct contact against the back panel 26, the wiper element 16 is maintained in a spaced, non-touching relation to any portion of the package 12.

The natural condition of the package 12 is more closely akin to that depicted in FIG. 9, which is a flattened shipping condition. When the top 32 and bottom 34 end flaps are bent into the closed condition, the package 12 is forced to adopt the cross-section depicted in FIG. 6. With a wiper device 14 loaded in the package 12, however, certain distortions are introduced into the flexible sheet material of the package 12, resulting in the somewhat misshapen configuration shown in FIG. 7. This is, nevertheless, part of the design criteria for the package 12 and helps to secure the wiper device 14 safely within the package 12. The central connection device 22 abuts the front 24 and back 26 panels midway along the length of the wiper device 14, whereas the end caps 20 on each of the distal ends of the wiper device 14 are constrained between the front 24 and back 26 panels on the other side of the package 12. All the while, the wiper element 16 is safely protected from contact even in the event of a moderate crushing blow to the package 12. Because the package 12 is symmetrical left-to-right, it does not matter which way the wiper blade 14 is oriented during loading. This latter consideration is especially beneficial in view of the issues faced when potential retail buyers remove the wiper blade 14 from the package 12 for visual inspection. Because the package 12 is non-polarized in terms of wiper orientation, the buyer can easily re-insert the wiper blade 14 in the package 12 and return the product to its intended display condition.

In order for the package 12 to achieve the generally flat empty shipping condition depicted in FIG. 9, the dimensional properties must be carefully described. For example, the transverse dimension of the front panel 24, represented by the letter A, must equal the combined transverse dimensions of the back panel 26 and the left 28 and right 30 side panels, represented by the letters B, C, and D. Thus, A=B+C+D. These dimensional relationships are maintained even when the package 12 is in its expanded cross-sectional configuration as determined by the shape of the top 32 and bottom 34 end flaps. See, for example, FIG. 10.

The subject package 12 is especially advantageous as a container for transporting wiper devices 14 intended for retail sales. The package 12 protects the fragile wiper element 16 until it is placed into service. The package 12 also possesses a very low profile and narrow width, all contributing to the efficient use of display space in a retail store setting. Furthermore, the package 12 is able to lie flat, as shown in FIG. 9, for efficient shipping and storage prior to being filled with a wiper device 14. The package 12 is easy to manufacture from plastic or other sheet stock material and readily adapted for printing on one or both sides as desired. The resealable nature of the package 12, as afforded by the top 32 and bottom 34 end flaps and their respective tongues 38, 40 (or 38', 40'), is especially advantageous in the retail selling environment, where consumers of wiper blades 14 may wish to examine the product prior to purchase.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A flat blade style wiper blade and shipping container package assembly, said assembly comprising:
   a flat blade windshield wiper having at least one elongated and curved flexor, a wiper element operatively connected to said flexor, and a connector affixed to said flexor generally midway along the length thereof;
   a protective package surrounding said wiper, said package including a flexible front panel, a generally planar back panel, a generally planar left side panel adjoining respective sides of said front and back panels, and a generally planar right side panel adjoining respective sides of said front and back panels opposite said left side panel;
   said package further including respective top and bottom end flaps spaced apart from one another, said top and bottom end flaps extending between said front and back panels for forcing said front panel to form in a generally semi-cylindrical configuration bowed outwardly relative to said back panel;
   said wiper disposed in a shipping condition in said package between said top and bottom end flaps, with said connector of said wiper bearing in direct pressing contact with said bowed front panel while said wiper element is maintained in a spaced, non-touching relation to any portion of said package; and
   wherein said flexor further includes longitudinally spaced apart terminal ends, and an end cap covering each of said terminal ends, said end caps pressing simultaneously and continuously outwardly against said front and back panels.

2. The assembly of claim 1 wherein said package is fabricated from a single piece of sheet stock.

3. The assembly of claim 1 wherein said top and bottom end flaps are formed as integral extensions of said bowed front panel.

4. The assembly of claim 1 wherein said right and left side panels extend away from said back panel in an obtusely oblique angle.

5. The assembly of claim 1 wherein package includes a hang tab.

6. The assembly of claim 1 wherein said top and bottom end flaps include respective closure features that interact with respective slots formed in said back panel.

7. The assembly of claim 6 wherein said closure features include at least one tab extending from said front panel.

8. The assembly of claim 7 wherein said at least one tab of said closure feature is affixed to said back panel.

9. The assembly of claim 1 wherein said package includes a glue flap extending from one of said left and right side panels for said overlapping said back panel.

10. A method for containing a flat blade style windshield wiper blade in a shipping and display package, said method comprising the steps of:

providing a flat blade windshield wiper having at least one elongated, curved flexor with longitudinally spaced apart terminal ends, a wiper element operatively connected to the flexor, and a connector affixed to the flexor generally midway along the length thereof;

surrounding the wiper with a protective package, wherein the package includes a flexible front panel, a back panel, and opposing left and right side panels respectively adjoining sides of the front and back panels;

forcing the front panel to form in a generally semi-cylindrical configuration bowed outwardly relative to the back panel;

wedging the wiper in three discrete regions of direct contact against the bowed front panel and three discrete regions of direct contact against the back panel while maintaining the wiper element in a spaced, non-touching relation to any portion of the package; and said forcing step including laterally displacing the front panel relative to the back panel in direct response to said wedging step whereby the terminal ends of the wiper press continuously against the front and back panels while the connector presses continuously against at least one of the front and back panels.

11. The method of claim 10 wherein said step of forcing the front panel to form in a generally semi-cylindrical configuration includes interposing top and bottom end flaps between said front and back panels.

12. The method of claim 11 wherein said step of forcing the front panel to form in a generally semi-cylindrical configuration includes retaining the top and bottom end flaps in the interposed position by means of a closure feature.

13. The method of claim 12 wherein said step of retaining the top and bottom end flaps in the interposed position includes capturing a tab extending from the front panel within a slot formed in the back panel.

14. The method of claim 13 wherein said step of capturing a tab includes mechanically affixing the tab to the back panel to prevent disassociation.

\* \* \* \* \*